(12) United States Patent
Wang

(10) Patent No.: US 7,221,780 B1
(45) Date of Patent: May 22, 2007

(54) SYSTEM AND METHOD FOR HUMAN FACE DETECTION IN COLOR GRAPHICS IMAGES

(75) Inventor: Lizhi Wang, Cupertino, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1246 days.

(21) Appl. No.: 09/585,980

(22) Filed: Jun. 2, 2000

(51) Int. Cl.
*G06K 9/00* (2006.01)

(52) U.S. Cl. ............... 382/118; 382/284; 340/5.83; 345/629

(58) Field of Classification Search ............ 382/103, 382/115, 118, 164, 165, 190, 199, 203, 274, 382/276; 340/5.52, 5.53, 5.8, 5.81, 5.82, 340/5.83
See application file for complete search history.

(56) References Cited

U.S. PATENT DOCUMENTS

| | | | | |
|---|---|---|---|---|
| 5,583,659 A * | 12/1996 | Lee et al. | .................. | 358/3.13 |
| 5,604,823 A * | 2/1997 | Ono | .................. | 382/199 |
| 5,631,697 A * | 5/1997 | Nishimura et al. | .................. | 348/172 |
| 5,751,286 A * | 5/1998 | Barber et al. | .................. | 345/835 |
| 5,774,177 A * | 6/1998 | Lane | .................. | 348/88 |
| 5,859,921 A * | 1/1999 | Suzuki | .................. | 382/118 |
| 5,867,609 A * | 2/1999 | Shamoon et al. | .................. | 382/278 |
| 6,075,557 A * | 6/2000 | Holliman et al. | .................. | 348/51 |
| 6,249,317 B1 * | 6/2001 | Hashimoto et al. | .................. | 348/364 |
| 6,263,113 B1 * | 7/2001 | Abdel-Mottaleb et al. | .. | 382/237 |
| 6,272,249 B1 * | 8/2001 | Kobayashi et al. | .......... | 382/224 |
| 6,445,835 B1 * | 9/2002 | Qian | .......................... | 382/306 |
| 6,542,625 B1 * | 4/2003 | Lee et al. | .................. | 382/118 |
| 2001/0044818 A1 * | 11/2001 | Liang | ......................... | 709/201 |

OTHER PUBLICATIONS

Birchfield, Stan. "Elliptical head tracking using intensity gradients and color histograms." Computer Vision and Pattern Recognition, 1998. IEEE Computer Society Conference, June 23-25, 1998, pp. 232-237.*

Singh et al. "Monitoring driver fatigue using facial analysis techniques." Intelligent Transportation Systems, 1999. IEEE/IEEJ/JSAI International Conference, Oct. 5-8, 1999, pp. 314-318.*

Zhang et al. "Locating facial features with color information." Signal Processing Proceedings, 1998. Fourth International Conference ICSP '98. vol. 2, Oct. 12-15, 1998, pp. 889-892.*

Birchfield, Stan. "An elliptical head tracker." Signals, Systems & Computers, 1997. Conference Record of the Thirty-First Asilomar Conference. vol. 2, Nov. 2-5, 1997, pp. 1710-1714.*

* cited by examiner

*Primary Examiner*—Jingge Wu
*Assistant Examiner*—Charles Kim
(74) *Attorney, Agent, or Firm*—Blakely, Sokoloff, Taylor & Zafman LLP

(57) ABSTRACT

A system and method for determining the location of human faces within a color graphics image is disclosed. The proposed method consists of several steps to distinguish face candidates from a complex background. The method determines areas with both low color gradient values and high relative intensity. These areas are then further selected on the basis of hue saturation. A final series of steps determines which of these candidate areas represent human faces within the original image.

45 Claims, 10 Drawing Sheets
(5 of 10 Drawing Sheet(s) Filed in Color)

SYSTEM AND METHOD FOR HUMAN FACE DETECTION IN COLOR GRAPHICS IMAGES

BACKGROUND OF THE INVENTION (1) Field of the Invention

The present invention relates to the field of computer graphics. In particular, the present invention relates to a system and a method for detecting human faces in an existing color graphics image.

(2) Description of Related Art

An automatic face recognition system should have the ability to identify one or more persons in a scene, starting from still or video images of the scene. A complete solution of the problem involves segmentation of faces from cluttered scenes, extraction of features from the face region, identification and matching. The first step in this process is face detection. The goal of face detection is to determine whether there is one or more human faces in the image, and, if present, return its location and spatial extent for further processing.

Most of the existing face detection systems use window-based or pixel-based operation to detect faces. In a window-based system, a small window is moved over all portions of an image to determine whether a face exists in each window based on distance metrics. Common problems with window-based approaches are that they cannot detect faces of different orientations or view angles, and that they are computationally expensive.

In representative pixel-based analyses, color segmentation is used as the first step. This assumes that human skin colors fall in a small, known region in color space. Some advantages of using color as feature are speed and invariance to orientation. However, it is difficult to model human skin color for several reasons. One reason is that different cameras produce significantly different color values. Another reason is that human skin color differs from person to person. Finally, skin color distribution shifts with changes in ambient illumination.

Therefore a method for reliably and efficiently detecting human faces within a graphical image is at issue in face recognition systems.

SUMMARY

A system and method for determining a series of candidate patches for human faces in a color graphic image is disclosed. The method may start by determining a first area wherein a color gradient has a low value, and then determining a second area wherein an intensity value has a high value. The method may then perform a logical AND on the first area and the second area to create a third area. The method may then select portions of this third area with suitable hue saturation values to form a series of candidate patches where the human faces reside.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The features, aspects, and advantages of the present invention will become more fully apparent from the following detailed description, appended claims, and accompanying drawings in which:

DETAILED DESCRIPTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail in order not to unnecessarily obscure the present invention.

Psychological studies of human face recognition by humans suggest that virtually every kind of available information is used simultaneously. For example, the configuration of the facial features can help humans find the location of the face, since it is known that the features can not appear in arbitrary arrangements. In contrast, a computer graphics system cannot use all kinds of information simultaneously. A limited number of kinds of information must be processed at any given time. Important constraints to the processing of selected kinds of information include simplicity of estimation of parameters, low dependency upon ambient light intensity, low dependency upon small changes of facial expression, and maximizing information content in those kinds of information selected.

In one embodiment of the present invention, color, shape, intensity, and face configuration information are combined together to locate faces in color images. This method of face detection advantageously is computationally efficient.

Figure 1:
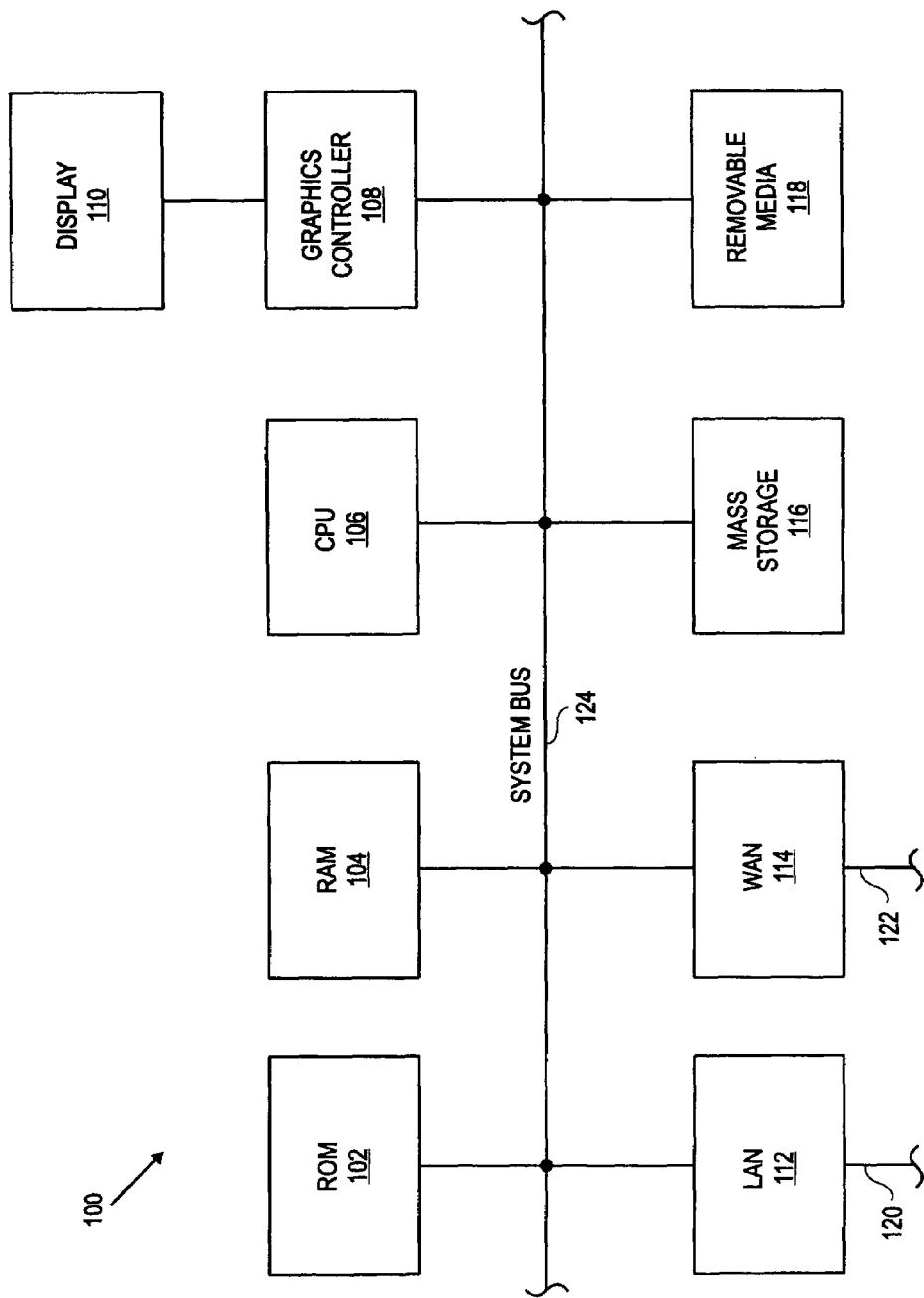
FIG. 1 is a block diagram of a computer graphics system, according to one embodiment of the present invention.

Referring now to FIG. 1, a block diagram of a computer graphics system 100 is shown, according to one embodiment of the present invention. Computer graphics system 100 may include read-only memory (ROM) 102, random-access memory (RAM) 104, one or more central processing units (CPU) 106, one or more graphics controllers 108 with attached displays 110, connections to a local area network (LAN) 120 and wide area network (WAN) 122 via LAN controller 112 and WAN controller 114, respectively, mass storage devices 116, and removable media 118. The functional parts of computer graphics system 100 may be connected via one or more system busses 124. Software executing on computer graphics system 100 may be loaded via the LAN 120, the WAN 122, or the removable media 118.

Figure 2:
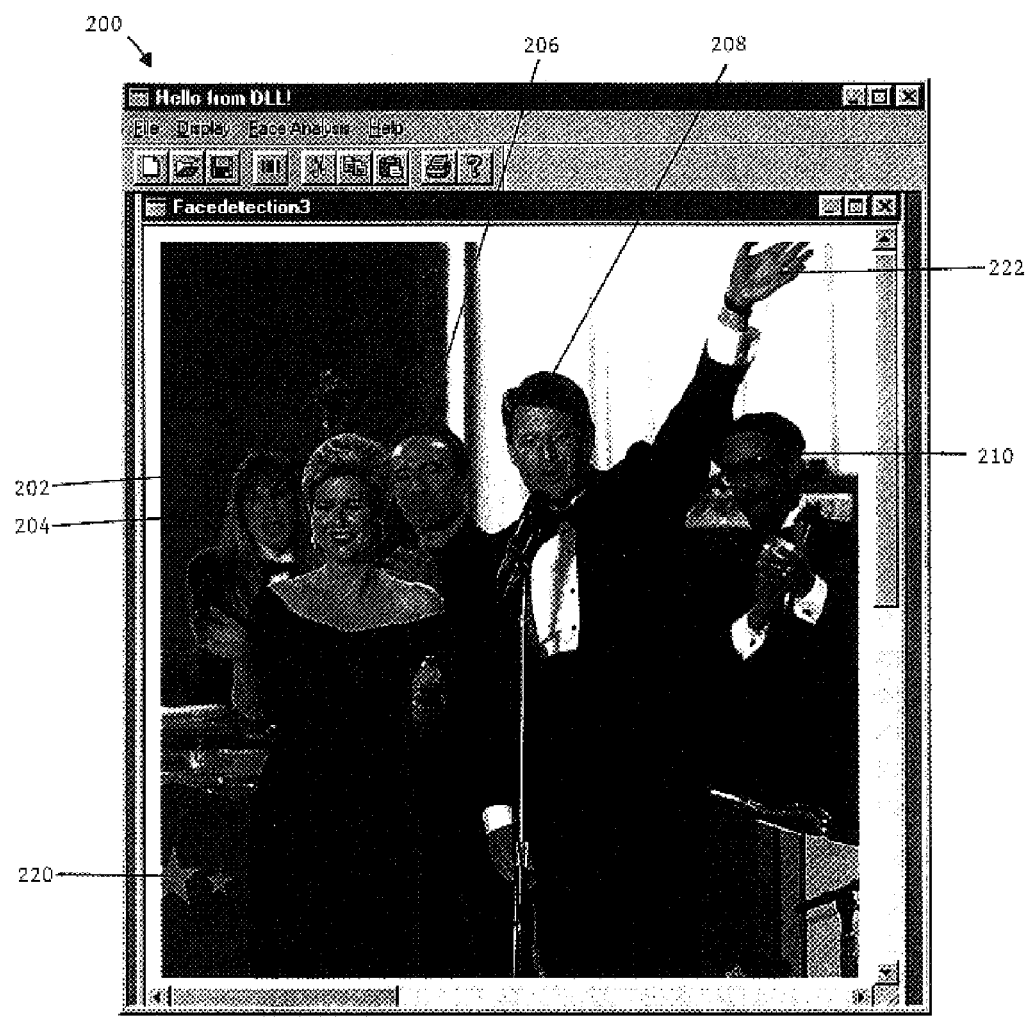
FIG. 2 is an unprocessed graphical image, according to one embodiment of the present invention.

Referring now to FIG. 2, an unprocessed graphical image 200 is shown, according to one embodiment of the present invention. Exemplary graphical image 200 includes five faces, 202, 204, 206, 208, and 210. Detecting these faces and exhibiting their size, shape, and location will be discussed in conjunction with FIG. 2 and related figures, FIGS. 3, 4, 5, 7, 8, and 9 below. In one embodiment, the following four assumptions are made: the facial area is relatively smooth and bright; the only lighting is ambient illumination; the outlines of human faces are roughly elliptical; and there are significant color and intensity changes inside facial areas because of the configuration of facial features.

The image of FIG. 2 is represented by a large number of picture elements (pixels), each with three words of data representing color and intensity. The words in one embodiment may include 8 bits. In alternate embodiments other word lengths may be used. In one embodiment, the three words may correspond to red intensity, green intensity, and blue intensity (RGB format). In alternate embodiments, the three words may be separated in other color spaces, such as luminance, chrominance minus blue, chrominance minus red (YCC format).

Figure 3:
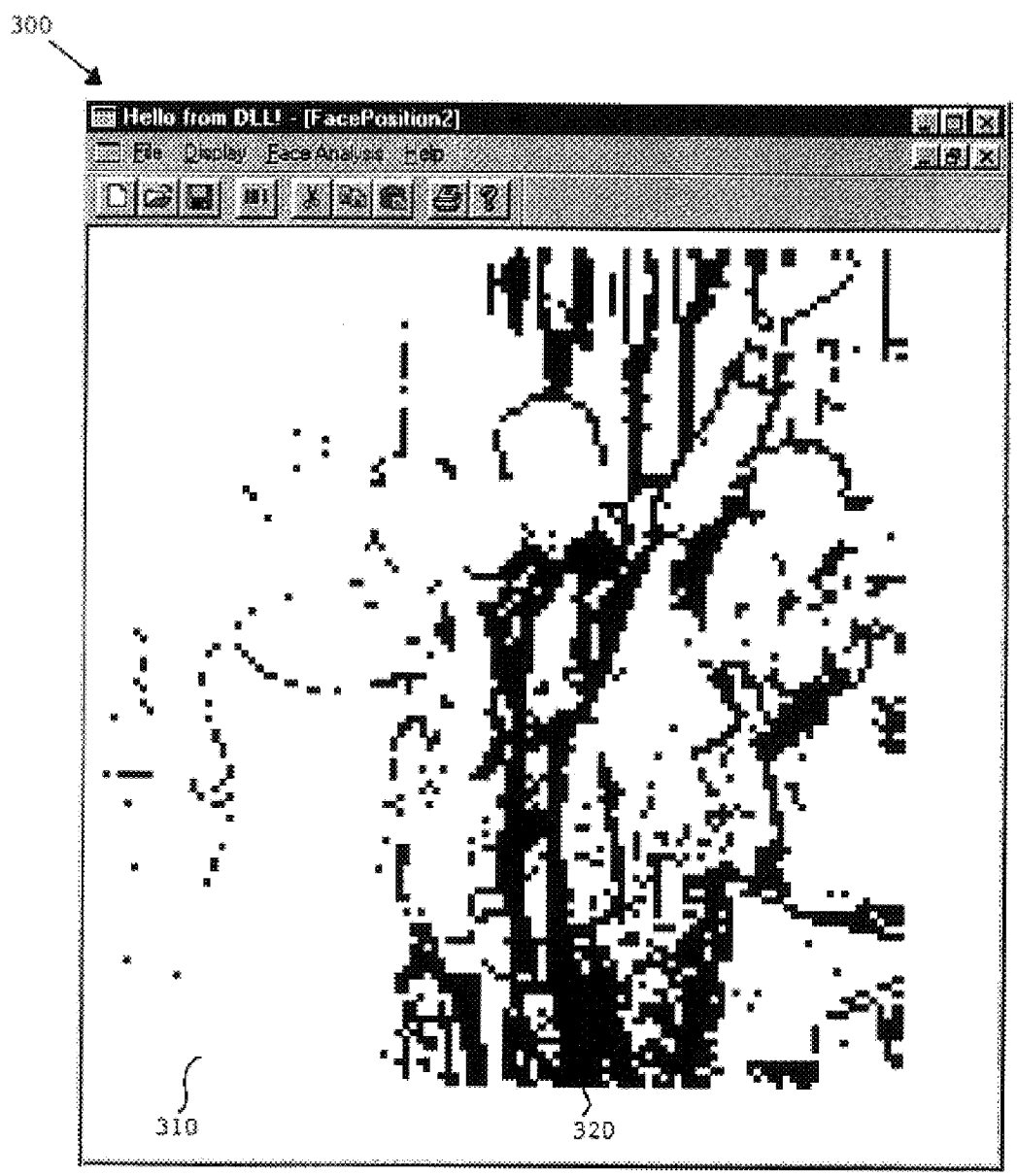
FIG. 3 is a color gradient map of the image of FIG. 2, according to one embodiment of the present invention.

Referring now to FIG. 3, a color gradient map 300 of the image of FIG. 2 is shown, according to one embodiment of the present invention. In one embodiment, the color gradient is the rate of change of color when going from one area to another. The color gradient may be used to extract homogeneous regions since it may be assumed that the facial area is relatively smooth. The color gradient may also extract edge information.

In order to calculate the color gradient, various methods of calculation may be used. In one embodiment, a Sobel filter, well-known in the art, is used to calculate a map of the magnitude of the color gradient. Commercially available Sobel filter software is available for many common computer graphics workstations.

The map of the magnitude of the color gradient, determined immediately above, is then converted by applying a true or false threshold value into a map wherein each pixel is represented by a single bit of data, true or false. The threshold is determined by the process of normalization. In normalization, the average value of the magnitude of the color gradient of all the pixels is determined. A fixed percentage of the average value is selected as the threshold, and then the magnitude of the color gradient for each pixel is compared with the threshold. If the magnitude is less than the threshold, the pixel is considered a "true". If the magnitude is more than the threshold, the pixel is considered a "false".

In one embodiment, the map wherein each pixel is represented by a single bit of data, determined as in the paragraph immediately above, is converted into a simplified mosaic representation. Use of a simplified mosaic representation filters out any noise yet retains the facial information. In one embodiment, each group of 4 by 4 pixels is replaced by a single mosaic pixel with a value assigned by determining the predominant value, true or false, assigned to the 16 pixels within the mosaic pixel. In other embodiments, other sizes of mosaic blocks may be used. This simplified mosaic representation of the above-described map may be termed a color gradient map.

FIG. 3 is a representative color gradient map for the image of FIG. 2, derived in accordance with the steps outlined above. The white area 310 is a region wherein the mosaic pixel values are all true. The black area 320 is a region wherein the mosaic pixel values are all false. In accordance with one embodiment, the black area 320 are areas rejected as candidate face locations, whereas the white areas 310 are areas considered for further processing as candidate face locations.

Figure 4:
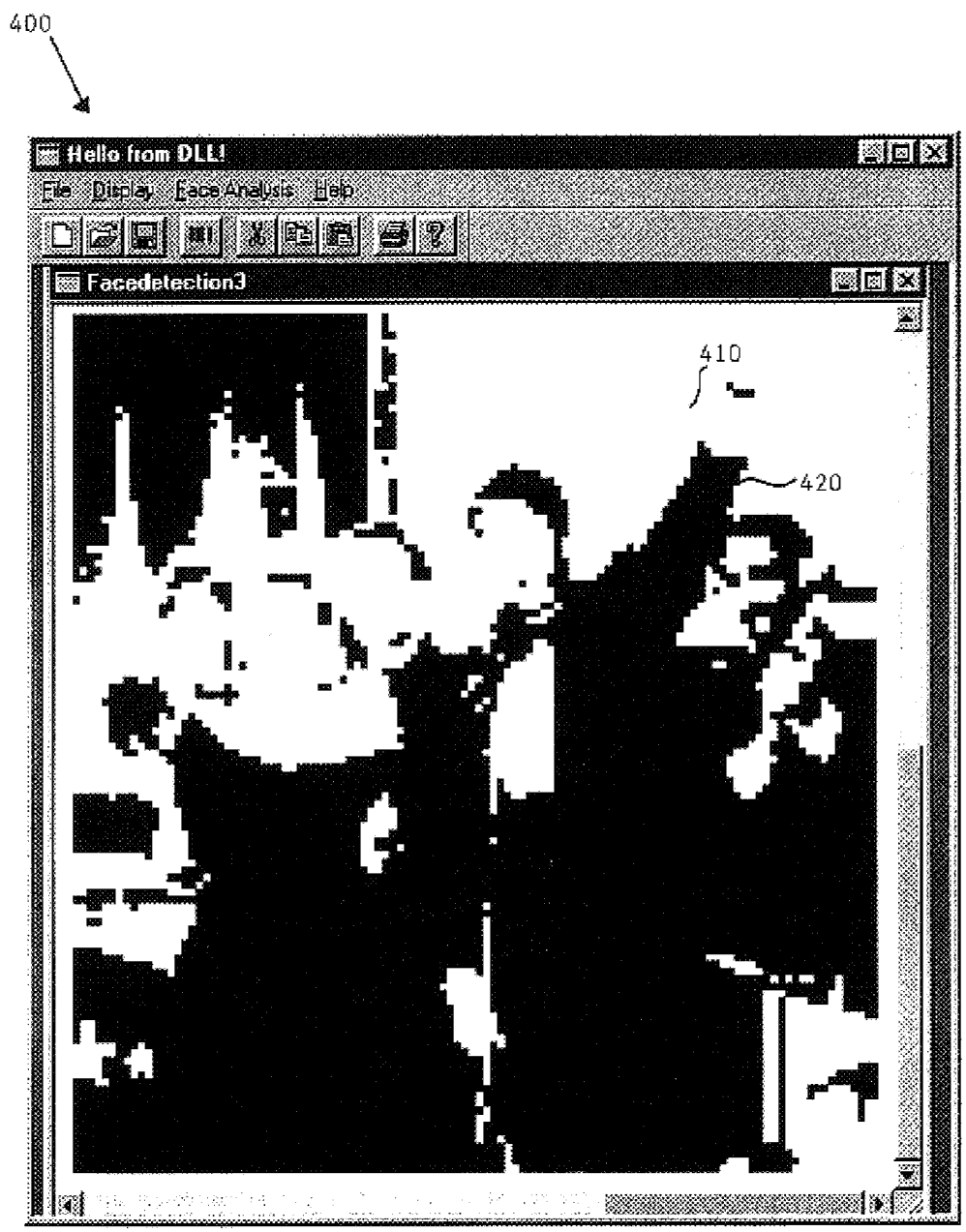
FIG. 4 is an intensity map of the image of FIG. 2, according to one embodiment of the present invention.

Referring now to FIG. 4, an intensity map 400 of the image of FIG. 2 is shown, according to one embodiment of the present invention. It is assumed that any faces in the image are well illuminated and well focused. Therefore, the facial areas may have higher intensities than the surrounding areas.

Again, a threshold value may be determined by the process of normalization. An intensity value for each pixel is first determined. An average value of the intensity values for all the pixels is then determined. A percentage of this average value is then selected as a threshold value.

The intensity value of each pixel is then compared with the threshold value. If the intensity of a pixel is greater than the threshold value, the pixel is assigned a value "true". If the intensity of a pixel is lower than the threshold value, the pixel is assigned a value "false".

As in the case of the color gradient map derivation, in one embodiment the map wherein each pixel is represented by a single bit of data, determined as in the paragraph immediately above, is converted into a simplified mosaic representation. In one embodiment, each group of 4 by 4 pixels is replaced by a single mosaic pixel with a value assigned by determining the predominant value, true or false, assigned to the 16 pixels within the mosaic pixel. In other embodiments, other sizes of mosaic blocks may be used. This simplified mosaic representation may be termed an intensity map.

FIG. 4 is a representative intensity map for the image of FIG. 2, derived in accordance with the steps outlined above. The white area 410 is a region wherein the mosaic pixel values are all true. The black area 420 is a region wherein the mosaic pixel values are all false. In accordance with one embodiment, the black area 420 are areas rejected as candidate face locations, whereas the white areas 410 are areas considered for further processing as candidate face locations.

Figure 5:
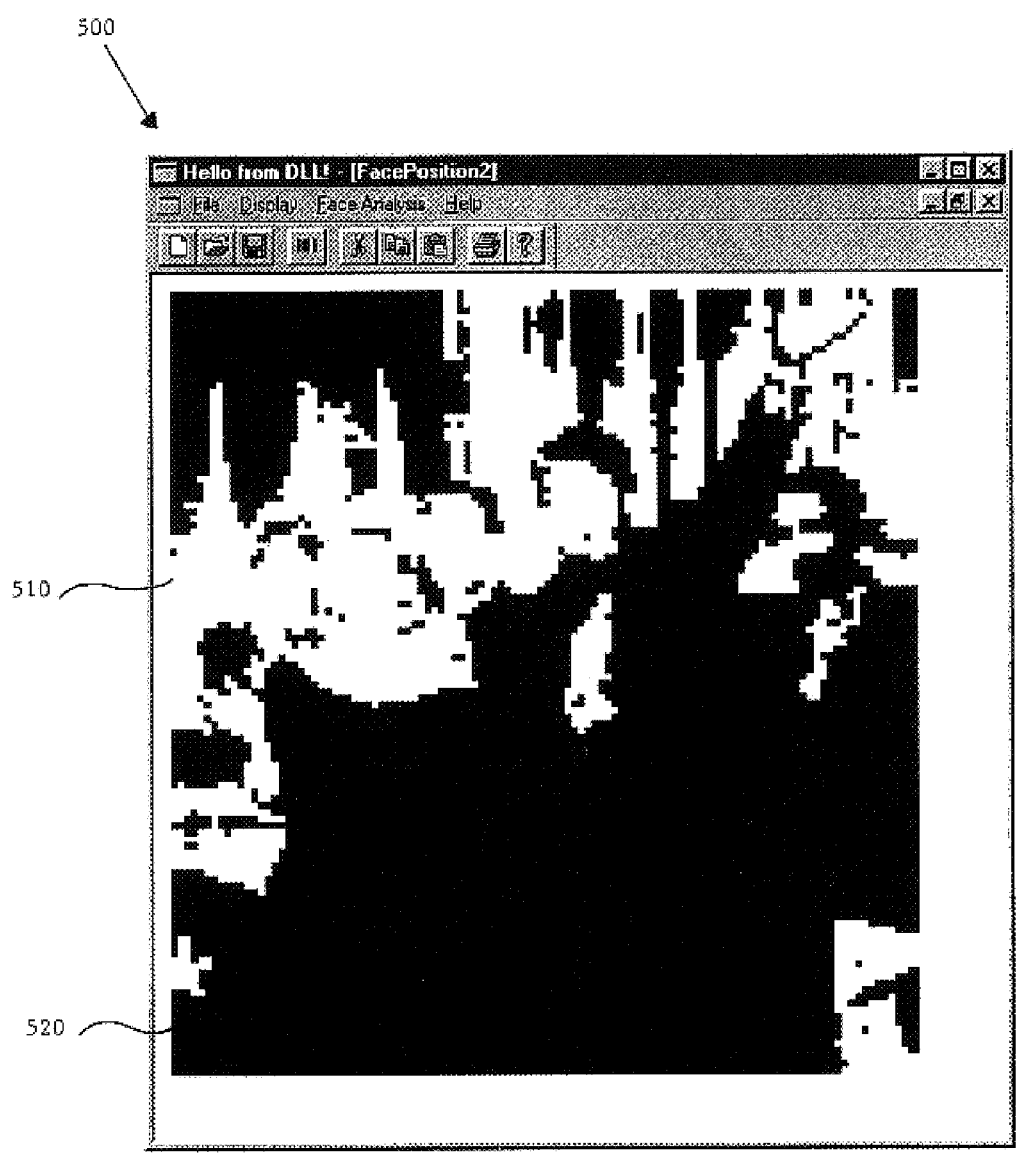
FIG. 5 is a combined map of the color gradient map of FIG. 3 and the intensity map of FIG. 4, according to one embodiment of the present invention.

Referring now to FIG. 5, a combined map 500 of the color gradient map of FIG. 3 and the intensity map of FIG. 4 is shown, according to one embodiment of the present invention. Each mosaic pixel of a combined map is first determined to be either true or false by performing a binary AND operation on the respective mosaic pixels in the color gradient map and the intensity map. Those resulting mosaic pixels whose value is true are areas that combine smoothness and brightness.

After performing the logical AND operation, a process known as morphological erosion is performed on the resulting map. Morphological erosion removes small true areas surrounding predominantly true areas in the following manner. For each mosaic pixel that has a value of true, examine all the neighboring mosaic pixels. If any of the neighboring mosaic pixels have a value of false, then replace the value of the central mosaic pixel with the value false. When this operation is performed a single time for all originally true pixels, the result is a map wherein each true area has had its peripheral area eroded. Sufficiently small true areas are removed entirely.

FIG. 5 shows the resulting combination map formed by the AND operation performed on FIG. 3 and FIG. 4, followed by one pass of the morphological erosion process. The white area 510 shows where the value is true, signifying candidate face locations. The black area 520 shows areas rejected from further consideration as face locations.

Figure 6:
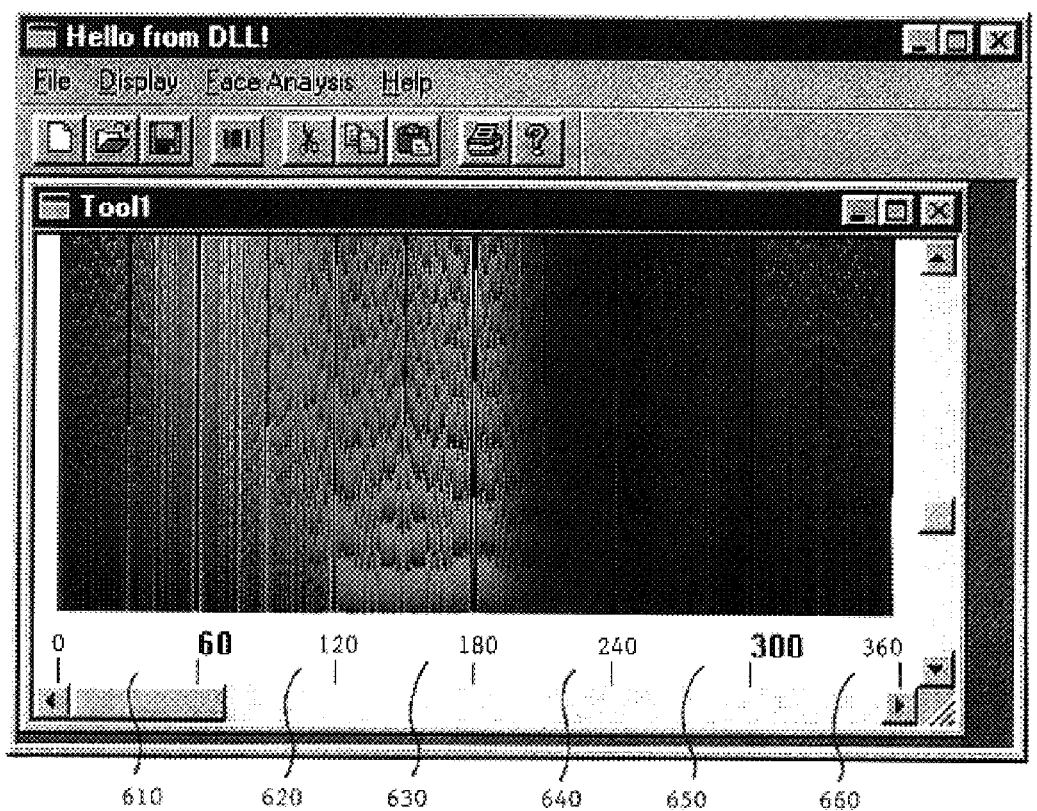
FIG. 6 is a hue spectrum chart, according to one embodiment of the present invention.

Referring now to FIG. 6, a hue spectrum chart is shown, according to one embodiment of the present invention.

Human skin color has been used as an important cue to locate human face in color images, based on the research results that human skin color tends to cluster in a pair of compact regions in certain transformed color space. One such transformed color space is hue saturation intensity (HSI) space. The chart of FIG. 6 shows a range in HSI space. In HSI space, region 610 is reddish-green, regions 620, 630 are greenish, region 640 is bluish, region 650 is purplish, and region 660 is bluish-red.

Figure 7:
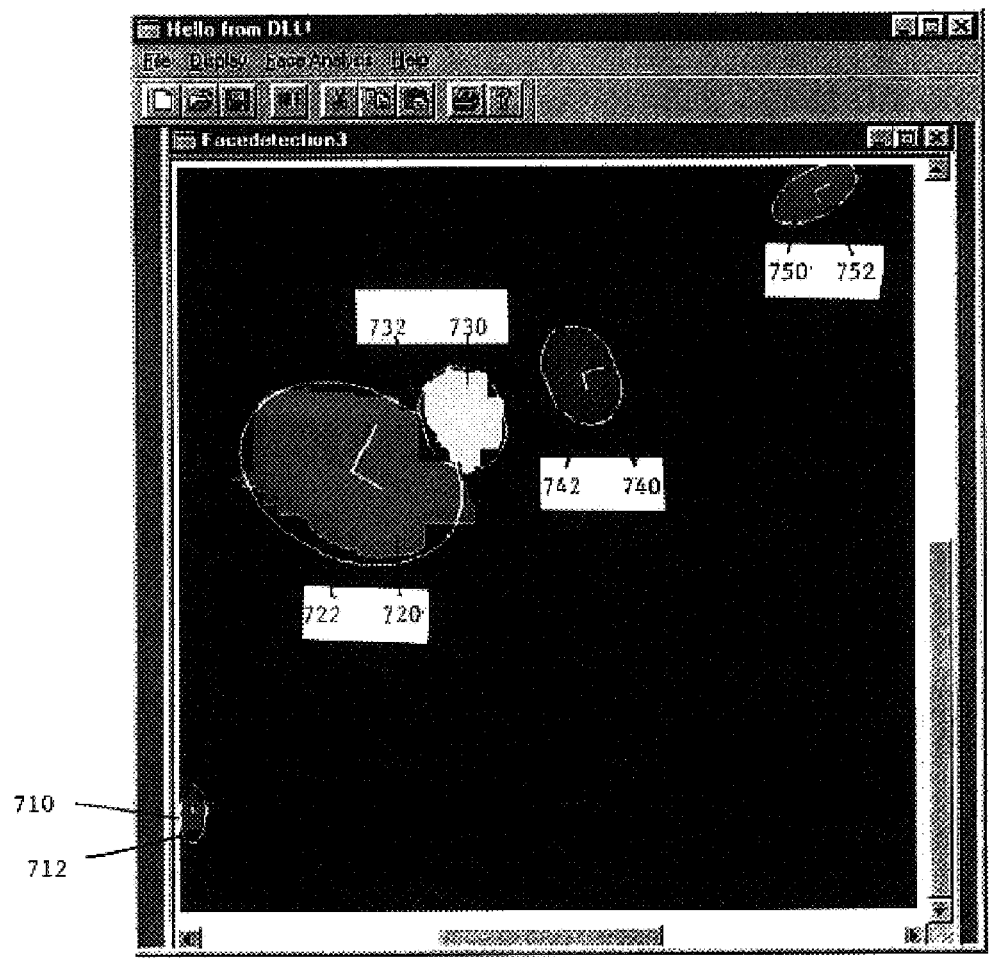
FIG. 7 is a set of candidate patches and determined ellipses for the image of FIG. 2, according to one embodiment of the present invention.

Referring now to FIG. 7, a set of candidate patches and determined ellipses for the image of FIG. 2 is shown, according to one embodiment of the present invention. The image of FIG. 2 is first converted to HSI space, using commercially available software. The candidate patches of FIG. 7 are then created by determining the parts of white area 510 of FIG. 5 which have HSI space values of region 610 and region 660. The resulting candidate patches 710, 720, 730, 740, and 750 are shown as irregular patches in FIG. 7.

Another step of morphological erosion may be performed on each candidate patch. As in the discussion in connection with FIG. 5, each mosaic pixel in a candidate patch is examined to see if any neighboring mosaic pixels are not within the candidate patch. If so, then the examined mosaic pixel is removed from the candidate patch.

Human facial outlines are consistently roughly elliptical. Therefore, for each candidate patch 710, 720, 730, 740, and 750 a corresponding ellipse 712, 722, 732, 742, and 752, respectively, is determined. In one embodiment, a Hoteling transform is used to create the corresponding ellipses. Commercially available Hoteling transform software may be used. In this step, the principle axis (major axis and minor axis) for each candidate patch are determined. The ellipse is completely specified by the principle axis.

Next the degree of fit of the ellipse is measured. In one embodiment, the degree of fit may be measured by counting the number of mosaic pixels of the candidate patch that are within the boundaries of the corresponding ellipse. The ratio of the number of mosaic pixels of the candidate patch within the corresponding ellipse to the total number of mosaic pixels in the candidate patch may be used as a measure of degree of fit. In one embodiment, if the above ratio is above 80%, the degree of fit is said to be good; if the above ratio is below 80%, the degree of fit is said to be bad. In alternate embodiments, other measurements for good and bad fit may be used.

Figure 8:
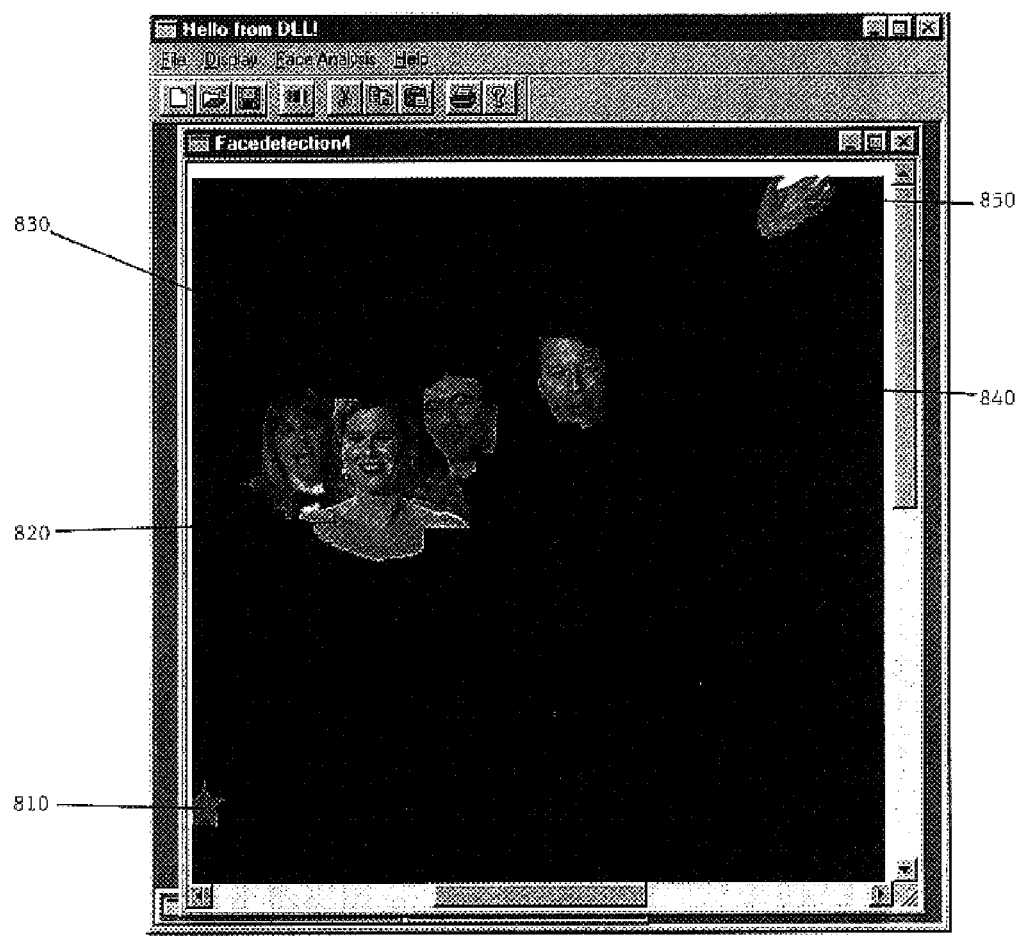
FIG. 8 shows the face candidate map superimposed on the image of FIG. 2, according to one embodiment of the present invention.

Referring now to FIG. 8, the face candidate map is superimposed on the image of FIG. 2, according to one embodiment of the present invention. Putting the face candidate map of FIG. 7 on the top of the original color image of FIG. 2 yields FIG. 8 which shows the detection initial result.

Candidate patches with bad degrees of fit may be further subdivided. For example, candidate patch 720 includes faces 202 and 204. In order to further subdivide candidate patch 720, the above process of deriving the color gradient map and intensity map are repeated within the candidate patch. A new normalization for thresholding may be performed. New candidate patches may be identified, and each of these may have a new ellipse calculated. If the new ellipses are again bad fits, then the process of subdividing may be repeated as necessary.

Whether or not the candidate patches are further subdivided, they are finally examined for a lack of detail. Human faces have great variety within the overall shape because of the features, which may include the eyes, nose, and mouth. Each candidate patch may therefore be examined by calculating the standard deviation of intensity within each candidate patch. If the intensity within the candidate patch exceeds a standard deviation from the mean value at certain places, the candidate patch is considered sufficiently "face like". If, however, the intensity fails to exceed a standard deviation from the mean value, then the candidate patch is removed from further consideration. As an example, the star shape at candidate patch 710 fails this particular test, so it is removed from further consideration.

Figure 9:
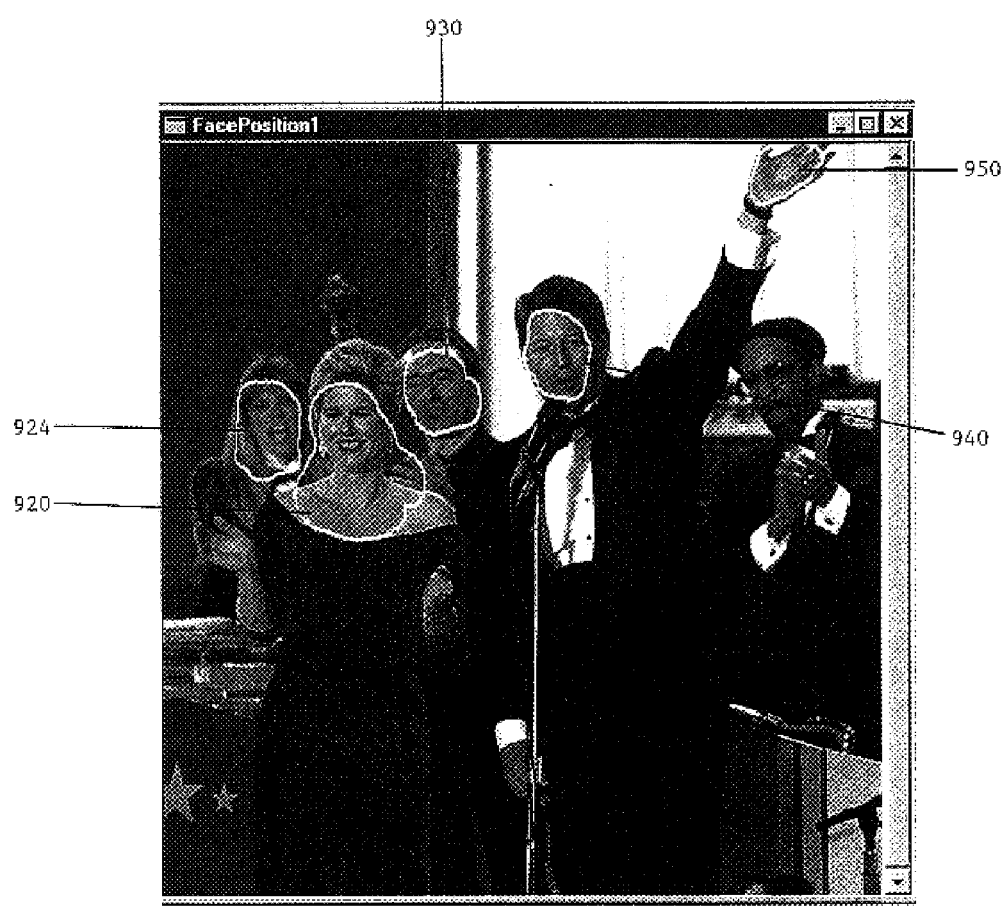
FIG. 9 shows the final result of the process, according to one embodiment of the present invention.

Referring now to FIG. 9, the final result of the process is shown, according to one embodiment of the present invention. Comparing previous and final results, we can see that the largest candidate patch 720 has been split into two candidate patches 924, 920, and the golden star at candidate patch 710 has been filtered out. The process has successfully and efficiently identified faces 202, 204, 206, and 208 of FIG. 2. Face 210 was missed due to lack of intensity and color gradient changes. Hand 222 was mistakenly identified as a face.

Figure 10:
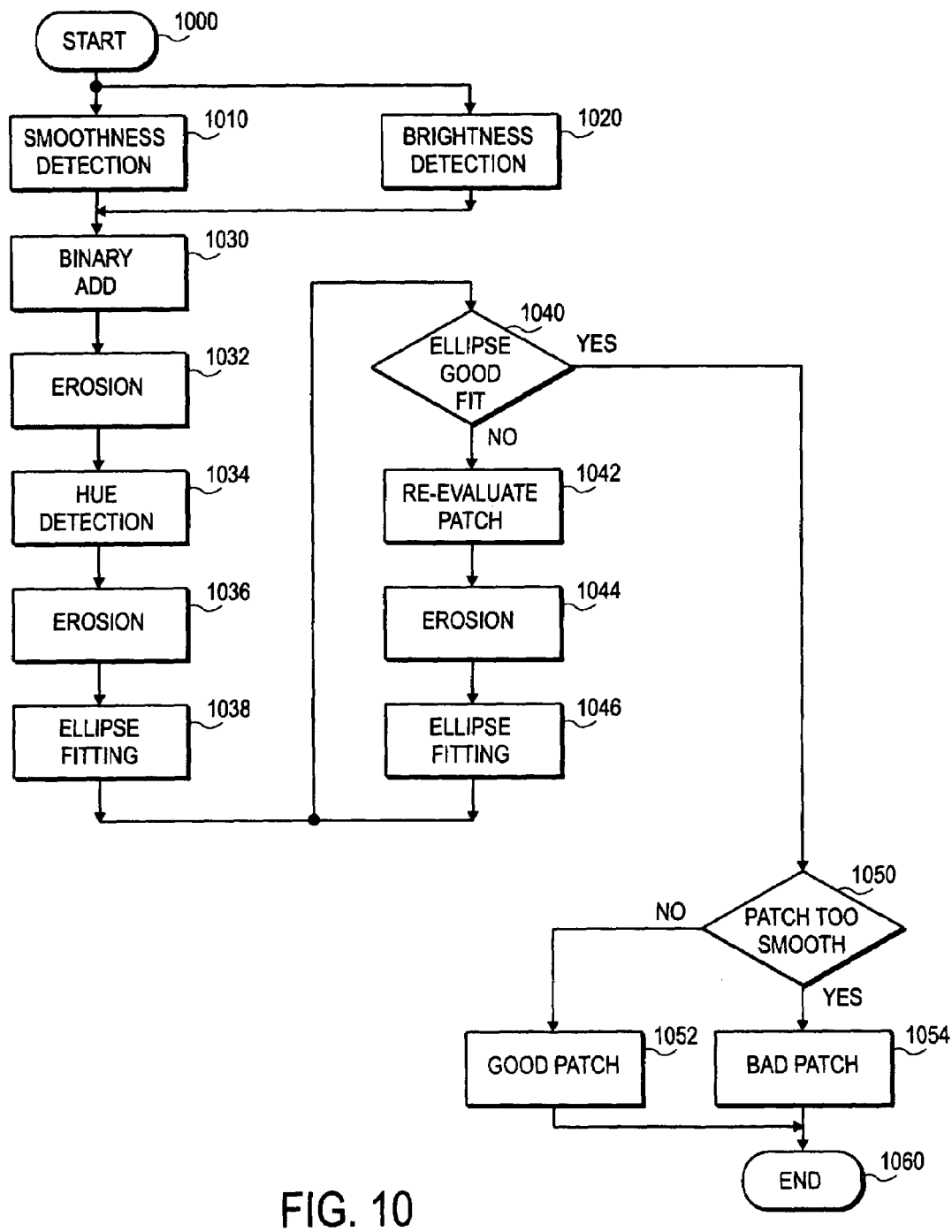
FIG. 10 is a flowchart of process steps, according to one embodiment of the present invention.

Referring now to FIG. 10, a flowchart of process steps is shown, according to one embodiment of the present invention. The process begins at start 1000 with the selection of a color graphics image. In two parallel steps, smoothness detection 1010 and brightness detection 1020, the color gradient map (discussed in connection with FIG. 3 above) and the intensity map (discussed in connection with FIG. 4 above) are derived. Then in the binary AND 1030 step, the color gradient map and the intensity map are combined.

In step 1032 a step of morphological erosion is performed. Then in step 1034 a hue detection step is performed, yielding initial candidate patches. After a second step of morphological erosion 1036 is performed, the ellipses for each candidate patch are determined in an ellipse fitting 1038 step. Then in step 1040, it is determined whether or not the ellipses are a good fit. If not, then the candidate patch is subjected to a further re-evaluation step 1042. After a further morphological erosion step 1044, a subsequent step of ellipse fitting 1046 is performed. These subsequent ellipses are again determined to be a good fit or a bad fit in step 1040.

If, however, the ellipses are determined to be a good fit to the candidate patches in step 1040, then a subsequent determination is made whether the candidate patch is too smooth (e.g. lacks detail) in step 1050. Step 1050 may include the variation by more than a standard deviation approach used in connection with FIG. 8 above. If the candidate patch is determined to be too smooth to be a face, then in step 1054 the candidate patch is considered a bad patch and discarded. If, however, the candidate patch is determined to contain suitable variation, then in step 1052 the candidate patch is added to the list of good candidate patches. The FIG. 10 process then ends 1060 with a list of good candidate patches.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of determining at least one candidate patch for human faces in a color graphic image, comprising:

determining a first area of the color graphic image wherein a color gradient has a low value;

determining a second area of the color graphic image wherein an intensity value has a high value;

performing a logical AND on said first area and said second area to determine a third area of the color graphic image; and selecting portions of said third area with suitable hue saturation to form said at least one candidate patch.

2. The method of claim 1, wherein said determining said first area uses a first threshold value comparison.

3. The method of claim 2, wherein said first threshold value is determined by normalization.

4. The method of claim 1, wherein said determining said second area uses a second threshold value comparison.

5. The method of claim 4, wherein said second threshold is determined by normalization.

6. The method of claim 1, further comprising eroding said third area.

7. The method of claim 6, wherein said eroding is morphological.

8. The method of claim 1, further comprising fitting an ellipse to one of said at least one candidate patch.

9. The method of claim 8, further comprising determining if said ellipse is a bad fit to said one of said at least one candidate patch.

10. The method of claim 9, further processing said one of said at least one candidate patch when said ellipse is a bad fit.

11. The method of claim 10, further comprising determining if said one of said at least one candidate patch is too smooth.

12. A system configured to determine at least one location of a human face in a color graphic image, comprising:

a color gradient map of the color graphic image configured to indicate true where a color gradient has a low value;

an intensity map of the color graphic image configured to indicate true where an intensity value has a high value;

a combined map configured to indicate true where said color gradient map is true and said intensity map is true; and at least one candidate patch selected from said combined map, wherein said candidate patches each have suitable hue saturation.

13. The system of claim 12, wherein said color gradient map includes a first threshold.

14. The system of claim 13, wherein said first threshold is determined by normalization.

15. The system of claim 12, wherein said intensity map includes a second threshold.

16. The system of claim 15, wherein said second threshold is determined by normalization.

17. The system of claim 12, wherein said combined map includes an eroded boundary.

18. The system of claim 17, wherein said boundary is morphologically eroded.

19. The system of claim 12, further comprising an ellipse fitted to said at least one candidate patch.

20. The system of claim 19, wherein said ellipse includes a degree of fit measure.

21. The system of claim 20, wherein said at lease one candidate patch is marked for further processing when said degree of fit is bad.

22. The system of claim 21, further comprising a candidate patch examiner configured to determine whether said at least one candidate patch is too smooth.

23. A machine-readable medium having stored thereon instructions for processing elements, which when executed by said processing elements perform the following:

determining a first area of the color graphic image wherein a color gradient has a low value;

determining a second area of the color graphic image wherein an intensity value has a high value;

performing a logical AND on said first area and said second area to determine a third area of the color graphic image; and selecting portions of said third area with suitable hue saturation to form at least one candidate patch.

24. The machine-readable medium of claim 23, wherein said determining said first area uses a first threshold value comparison.

25. The machine-readable medium of claim 24, wherein said first threshold value is determined by normalization.

26. The machine-readable medium of claim 23, wherein said determining said second area uses a second threshold value comparison.

27. The machine-readable medium of claim 26, wherein said second threshold is determined by normalization.

28. The machine-readable medium of claim 23, further comprising eroding said third area.

29. The machine-readable medium of claim 28, wherein said eroding is morphological.

30. The machine-readable medium of claim 23, further comprising fitting an ellipse to one of said at least one candidate patch.

31. The machine-readable medium of claim 30, further comprising determining if said ellipse is a bad fit to said one of said at least one candidate patch.

32. The machine-readable medium of claim 31, further processing said one of said at least one candidate patch when said ellipse is a bad fit.

33. The machine-readable medium of claim 32, further comprising determining if said one of said at least one candidate patch is too smooth.

34. A apparatus comprising:

a processor coupled to a memory through a bus; and a detection process executed by the processor from the memory to cause the processor to determine a first area of a color graphic image wherein a color gradient has a low value;

determine a second area of the color graphic image wherein an intensity value has a high value;

perform a logical AND on said first area and said second area to determine a third area of the color graphic image; and select portions of said third area with suitable hue saturation to form at least one candidate patch.

35. The apparatus of claim 34, wherein the detection process to further cause the processor, when determining said first area, to use a first threshold value comparison.

36. The apparatus of claim 35, wherein said first threshold value is determined by normalization.

37. The apparatus of claim 34, the detection process to further cause the processor, when determining said second area, to use a second threshold value comparison.

38. The apparatus of claim 37, wherein said second threshold is determined by normalization.

39. The apparatus of claim 34, the detection process to further cause the processor to erode said third area.

40. The apparatus of claim 39, wherein said eroding is morphological.

41. The apparatus of claim 34, the detection process to further cause the processor to fit an ellipse to one of said at least one candidate patch.

42. The apparatus of claim 41, the detection process to further cause the processor to determine if said ellipse is a bad fit to said one of said at least one candidate patch.

43. The apparatus of claim 42, the detection process to further cause the processor to process said one of said at least one candidate patch when said ellipse is a bad fit.

44. The apparatus of claim 43, the detection process to further cause the processor to determine if said one of said at least one candidate patch is too smooth.

45. A apparatus, comprising:
- a means for determining a first area of a color graphic image wherein a color gradient has a low value;
- a means for determining a second area of the color graphic image wherein an intensity value has a high value;
- a means for performing a logical AND on said first area and said second area to determine a third area of the color graphic image; and
- a means for selecting portions of said third area with suitable hue saturation to form at least one candidate patch.

* * * * *